US011615015B2

(12) United States Patent
Renie et al.

(10) Patent No.: US 11,615,015 B2
(45) Date of Patent: Mar. 28, 2023

(54) TRACE ANOMALY GROUPING AND VISUALIZATION TECHNIQUE

(71) Applicant: Metawork Corporation, Wilmington, DE (US)

(72) Inventors: David Michael Renie, Atherton, CA (US); Nicholas DeMonner, Redwood City, CA (US); David Marcin, Saratoga, CA (US); Margaret Henry, Redwood City, CA (US)

(73) Assignee: Metawork Corporation, Wilmington, DE (US)

( * ) Notice: Subject to any disclaimer, the term of this patent is extended or adjusted under 35 U.S.C. 154(b) by 0 days.

(21) Appl. No.: 16/931,379

(22) Filed: Jul. 16, 2020

(65) Prior Publication Data
US 2022/0019512 A1 Jan. 20, 2022

(51) Int. Cl.
*G06F 9/44* (2018.01)
*G06F 11/36* (2006.01)

(52) U.S. Cl.
CPC ........ *G06F 11/364* (2013.01); *G06F 11/3612* (2013.01); *G06F 11/3644* (2013.01); *G06F 11/3664* (2013.01); *G06F 11/3692* (2013.01)

(58) Field of Classification Search
CPC .............. G06F 11/364; G06F 11/3612; G06F 11/3644; G06F 11/3664; G06F 11/3692
See application file for complete search history.

(56) References Cited

U.S. PATENT DOCUMENTS

| 5,903,730 A * | 5/1999 | Asai ...................... G06F 11/323 714/E11.181 |
| 8,032,866 B1 | 10/2011 | Golender et al. |
| 2002/0087949 A1 | 7/2002 | Golender et al. |

(Continued)

OTHER PUBLICATIONS

PCT Notification of Transmittal of the International Search Report and the Written Opinion of the International Searching Authority, or the Declaration, International Searching Authority, International Application No. PCT/US2021/039789, dated Oct. 28, 2021, 16 pages.

*Primary Examiner* — Hang Pan
(74) *Attorney, Agent, or Firm* — Cesari and McKenna, LLP

(57) ABSTRACT

A trace anomaly grouping and visualization technique logically groups traces with anomalies to cases to enable software developers to monitor, diagnose and visualize the anomalies, as well as to solve the anomalies during application development and production. A client library of an investigative platform collects signals from traces (trace signal information). The technique organizes (groups) related trace signals of methods with anomalies (e.g., exceptions, performance abnormalities such as slowness) into datasets (denominated as "cases") based on common cause for an anomaly and correlates the signals to identify a case. The collected information may be used to differentiate between root causes of the anomalies using a comparative visualization of traces displayed on a standard user interface of the investigative platform. As such, the technique facilitates an understanding of differences among traces of (Continued)

executable code that resulted in the failure and traces without failure by providing the ability to comparatively examine views of those traces displayed on the standard UI. Signals of two or more traces may be selected and displayed side-by-side for comparison. The traces may be selected from a general notion of a healthy trace and a failed trace.

20 Claims, 5 Drawing Sheets

(56) References Cited

U.S. PATENT DOCUMENTS

| | | | | |
|---|---|---|---|---|
| 2003/0088854 | A1* | 5/2003 | Wygodny | G06F 11/3636 717/130 |
| 2006/0123389 | A1* | 6/2006 | Kolawa | G06F 11/3616 717/101 |
| 2006/0136784 | A1* | 6/2006 | Prescott | G06F 11/0748 714/38.11 |
| 2007/0277155 | A1* | 11/2007 | Casey | G06F 11/3466 717/124 |
| 2009/0055889 | A1* | 2/2009 | Carlson | G06F 21/6245 726/1 |
| 2011/0289360 | A1* | 11/2011 | Cathro | G06F 11/3636 714/45 |
| 2014/0109111 | A1* | 4/2014 | Gupta | G06F 11/0736 719/318 |
| 2014/0229770 | A1* | 8/2014 | Klic | G06F 11/3636 714/45 |
| 2016/0224461 | A1* | 8/2016 | Araya | G06F 11/3644 |
| 2018/0032905 | A1 | 2/2018 | Abercrombie | |
| 2018/0203795 | A1 | 7/2018 | Gadiya et al. | |

* cited by examiner

FIG. 5

TRACE ANOMALY GROUPING AND VISUALIZATION TECHNIQUE

BACKGROUND

Technical Field

The present disclosure relates to software application development and production and, more specifically, to an investigative platform having observability tools configured to diagnose and solve errors associated with software application development and production.

Background Information

Conventional observability tools are typically used in both software development and production environments to infer internal states of an executing software application (e.g., executable code) from knowledge of external outputs. However, these tools generally have a limited view/observation of information for a user (software developer) to obtain sufficient information (e.g., internal state information) about executable code to correctly diagnose a malfunction. That is, the tools typically collect information, such as logs, metrics and traces, from the executable code at runtime with insufficient detail and independently. As a result, an integrated view of sufficient fidelity across the collected information is not possible to aid the malfunction diagnosis, especially with respect to a historical view of specific operations manifesting the malfunction. For example, the tools may capture exceptions raised by the executable code that indicate a malfunction, but the root cause may be buried in a history of specific data values and processing leading to the exception. As such, examining a voluminous history of invocations and data changes across the collected information is often necessary to successfully diagnose the malfunction.

The conventional observability tools typically collect and associate signals from traces in which errors (e.g., exceptions) occurred according to the location at which the exception was raised (source location of the exception), which presumes that a small amount of faulty code is the root cause of the errors. For example, if an exception was raised at a certain line of source code, it may be assumed that different requests manifesting that exception being raised at that line of source code correspond to the same error. However, often there are multiple underlying causes that result in the line of code raising the exception, which may mask the root cause of the errors, such that grouping of errors by the source location of the exception is not descriptive of (does not differentiate between) the root cause of the errors.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which:

FIG. 5 is a screenshot of a user interface (UI) embodiment that displays trace anomalies on a standard UI in accordance with a trace anomaly grouping and visualization technique.

OVERVIEW

Figure 1:
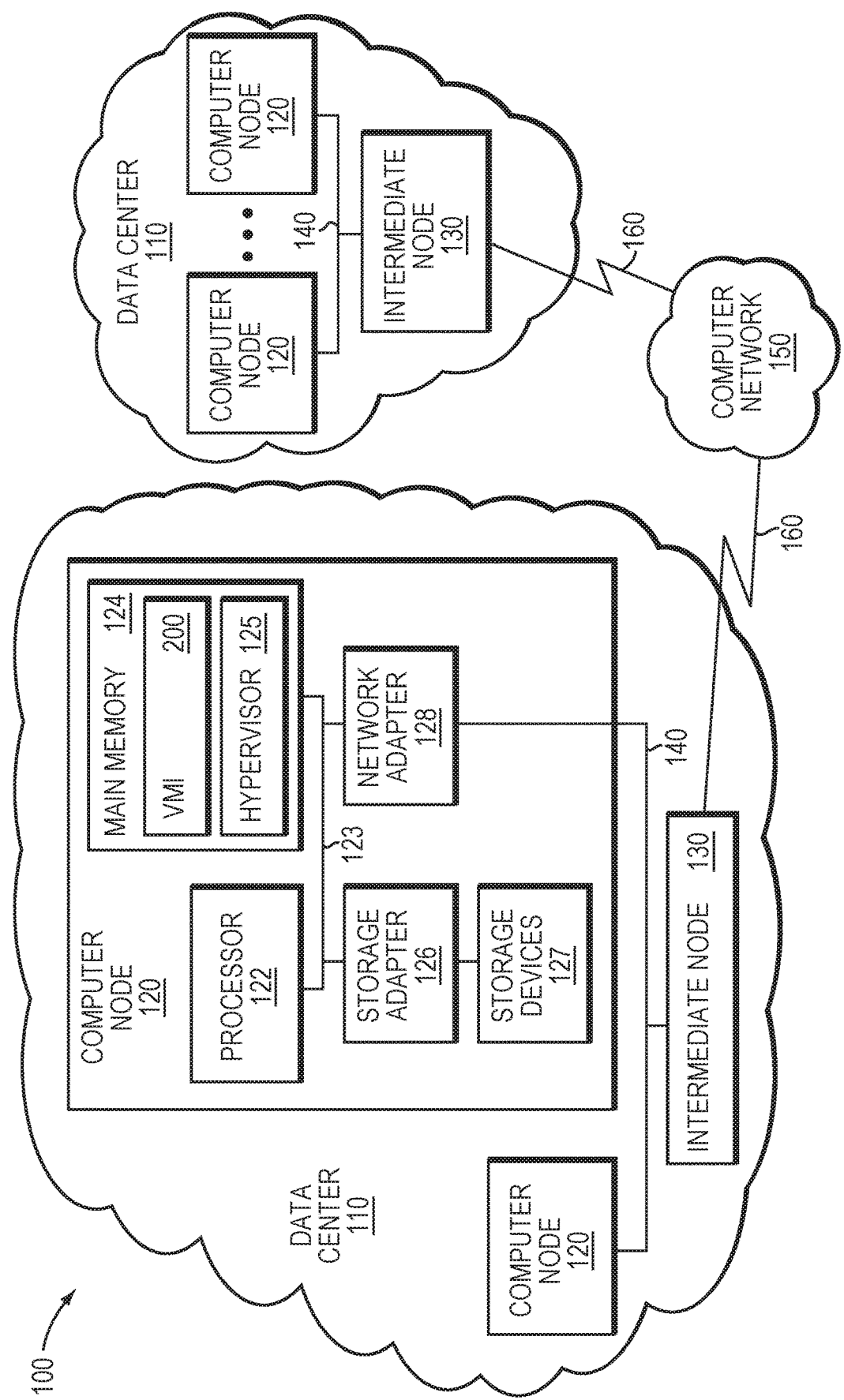
FIG. 1 is a block diagram of a virtualized computing environment.

The embodiments described herein are directed to a trace anomaly grouping and visualization technique that logically groups (associates) traces (e.g., execution of code and associated data/variables) with anomalies to cases to enable software developers to monitor, diagnose and visualize the anomalies, as well as to solve the anomalies during application development and production. As used herein, an anomaly denotes any departure from an expected norm of operation which leads a user application to deliver an unintended experience to an end user including, inter alia, (i) failures disrupting operations; (ii) exceptions being raised; (iii) performance outside a range (e.g., slower than an expected lowest bound or faster than an expected highest bound); (iv) lack of data integrity (e.g., empty fields of data structures, trampled data structures, incorrect pointer references which may lead to address space violations/exceptions); (v) data security violations, such as leaking personal identifiable information (PII); (vi) resource management errors (e.g., memory leaks from failure to correctly deallocate objects/memory); (vii) abnormal operating system resource consumption (e.g., abnormal/excessive input/output operations, such as network bandwidth consumed, storage operations and space consumed); and (viii) application process state abnormalities (e.g., deadlocks, zombie processes, hang-ups and the like).

A client library of an investigative platform is loaded in a user application executing on a virtual machine instance of a virtualized computing environment or, for other embodiments, on an actual computer/machine. The client library interacts with a separate agent process of the platform to instrument executable code (e.g., symbolic text, interpreted bytecodes, machine code and the like visible to the client library) of the user application and, to that end, loads a capture configuration (dynamic configuration) that specifies information such as, inter alia, methods and associated arguments, variables and data structures (values), to instrument. The client library inspects the executable code to determine portions of the code to instrument based on rules or heuristics of the dynamic configuration, which represent a degree of fidelity (e.g., a frequency) of the executable code and information to trace at runtime. Capture points of the runtime application are implemented as callback functions (callbacks) to the client library, which are registered with a runtime system executing the user application.

Illustratively, the client library may examine a language runtime stack and associated call history during a capture interval, i.e., a method execution event triggering the callback, and gather symbolic information, e.g., symbols and associated source code (when available) from the runtime system, invocations of methods, arguments/variables (including local and instance variables) and return values of the methods, as well as any exceptions raised based on a capture filter. In an embodiment, the capture filter is a table having identifiers associated with the methods to instrument, such that presence of a particular identifier in the table results in trace capture of the method associated with the identifier during the capture interval. When an exception is raised, the client library captures detailed information for every method in the stack, even if it was not instrumented in detail initially. The client library may also inspect language runtime internals to determine values of data structures used by the application. In an embodiment, the dynamic configuration for data structures involves walking the structures based on a defined level of nesting (e.g., depth of the data structures) which may be specified per data structure type, instance, method, and the like. All gathered information and executed executable code are transferred to the agent process via shared memory and/or Inter Process Communication (such as message passing via sockets, pipes and the like) to isolate the capture from the executing user application. The captured trace information may be reported graphically and interactively to a user via a user interface infrastructure of the investigative platform.

In an embodiment, the client library collects signals from traces (trace signal information) such as (i) invoked method, (ii) method source location, (iii) serial order of method calls, referred to as a "stack trace", (iv) operation name, (v) method arguments, (vi) local variable values, (vii) return values, (viii) any associated exception, and (ix) any exception state of values collected. Illustratively, the trace anomaly grouping and visualization technique organizes (groups) related trace signals of methods with anomalies (e.g., exceptions, performance abnormalities such as slowness) into datasets (denominated as "cases") based on common cause for an anomaly and correlates the signals to identify a case. The trace signal information collected by the client library may be used to differentiate between root causes of the anomalies (e.g., errors, failures and/or performance abnormalities) using a comparative visualization of traces displayed on a standard user interface of the investigative platform. As such, the technique facilitates an understanding of differences among traces of executable code that resulted in the failure and traces without failure by providing the ability to comparatively examine views of those traces displayed on the standard UI. Signals of two or more traces may be selected manually or automatically and displayed side-by-side for comparison. The automatic selection of traces is made from bicameral trace classification: healthy traces (i.e., those without anomaly) and failure traces (i.e., those with anomaly), wherein one or more traces from each classification may be chosen based on search criteria, such as method exceptions, data values, and method performance. In this manner, a large collection of healthy traces and failure traces for a case may be pooled for selection of representative traces that enhance render aspects of (i.e., clarify) the anomaly refined by the selection criteria.

DESCRIPTION

The disclosure herein is generally directed to an investigative platform having observability tools that enable software developers to monitor, investigate, diagnose and remedy errors as well as other deployment issues including code review associated with application development and production. In this context, an application (e.g., a user application) denotes a collection of interconnected software processes or services, each of which provides an organized unit of functionality expressed as instructions or operations, such as symbolic text, interpreted bytecodes, machine code and the like, which is defined herein as executable code and which is associated with and possibly generated from source code (i.e., human readable text written in a high-level programming language) stored in repositories. The investigative platform may be deployed and used in environments (such as, e.g., production, testing, and/or development environments) to facilitate creation of the user application, wherein a developer may employ the platform to provide capture and analysis of the operations (contextualized as "traces") to aid in executable code development, debugging, performance tuning, anomaly detection, and/or anomaly capture managed by issue.

In an exemplary embodiment, the investigative platform may be used in a production environment which is executing (running) an instance of the user application. The user application cooperates with the platform to capture traces (e.g., execution of code and associated data/variables) used to determine the cause of errors, faults and inefficiencies in the executable code and which may be organized by issue typically related to a common root cause. To that end, the investigative platform may be deployed on hardware and software computing resources, ranging from laptop/notebook computers, desktop computers, and on-premises ("on-prem") compute servers to, illustratively, data centers of virtualized computing environments.

FIG. 1 is a block diagram of a virtualized computing environment 100. In one or more embodiments described herein, the virtualized computing environment 100 includes one or more computer nodes 120 and intermediate or edge nodes 130 collectively embodied as one or more data centers 110 interconnected by a computer network 150. The data centers may be cloud service providers (CSPs) deployed as private clouds or public clouds, such as deployments from Amazon Web Services (AWS), Google Compute Engine (GCE), Microsoft Azure, typically providing virtualized resource environments. As such, each data center 110 may be configured to provide virtualized resources, such as virtual storage, network, and/or compute resources that are accessible over the computer network 150, e.g., the Internet. Each computer node 120 is illustratively embodied as a computer system having one or more processors 122, a main memory 124, one or more storage adapters 126, and one or more network adapters 128 coupled by an interconnect, such as a system bus 123. The storage adapter 126 may be configured to access information stored on storage devices 127, such as magnetic disks, solid state drives, or other similar media including network attached storage (NAS) devices and Internet Small Computer Systems Interface (iSCSI) storage devices. Accordingly, the storage adapter 126 may include input/output (I/O) interface circuitry that couples to the storage devices over an I/O interconnect arrangement, such as a conventional peripheral component interconnect (PCI) or serial ATA (SATA) topology.

The network adapter 128 connects the computer node 120 to other computer nodes 120 of the data centers 110 over local network segments 140 illustratively embodied as shared local area networks (LANs) or virtual LANs (VLANs). The network adapter 128 may thus be embodied as a network interface card having the mechanical, electrical and signaling circuitry needed to connect the computer node 120 to the local network segments 140. The intermediate node 130 may be embodied as a network switch, router, firewall or gateway that interconnects the LAN/VLAN local segments with remote network segments 160 illustratively embodied as point-to-point links, wide area networks (WANs), and/or virtual private networks (VPNs) implemented over a public network (such as the Internet). Communication over the network segments 140, 160 may be effected by exchanging discrete frames or packets of data according to pre-defined protocols, such as the Transmission Control Protocol/Internet Protocol (TCP/IP) and the User Datagram Protocol (UDP), although other protocols, such as the OpenID Connect (OIDC) protocol, the HyperText Transfer Protocol Secure (HTTPS), HTTP/2, and the Google Remote Procedure Call (gRPC) protocol may also be advantageously employed.

The main memory 124 includes a plurality of memory locations addressable by the processor 122 and/or adapters for storing software programs (e.g., user applications, processes and/or services) and data structures associated with the embodiments described herein. As used herein, a process (e.g., a user mode process) is an instance of a software program (e.g., a user application) executing in the operating system. The processor and adapters may, in turn, include processing elements and/or circuitry configured to execute the software programs, including an instance of a virtual machine and a hypervisor 125, and manipulate the data structures. The virtual machine instance (VMI) 200 is managed by the hypervisor 125, which is a virtualization platform configured to mask low-level hardware operations and provide isolation from one or more guest operating systems executing in the VMI 200. In an embodiment, the hypervisor 125 is illustratively the Xen hypervisor, although other types of hypervisors, such as the Hyper-V hypervisor and/or VMware ESX hypervisor, may be used in accordance with the embodiments described herein. As will be understood by persons of skill in the art, in other embodiments, the instance of the user application may execute on an actual (physical) machine.

It will be apparent to those skilled in the art that other types of processing elements and memory, including various computer-readable media, may be used to store and execute program instructions pertaining to the embodiments described herein. Also, while the embodiments herein are described in terms of software programs, processes, services and executable code stored in memory or on storage devices, alternative embodiments also include the code, services, processes and programs being embodied as logic, components, and/or modules consisting of hardware, software, firmware, or combinations thereof.

Figure 2:
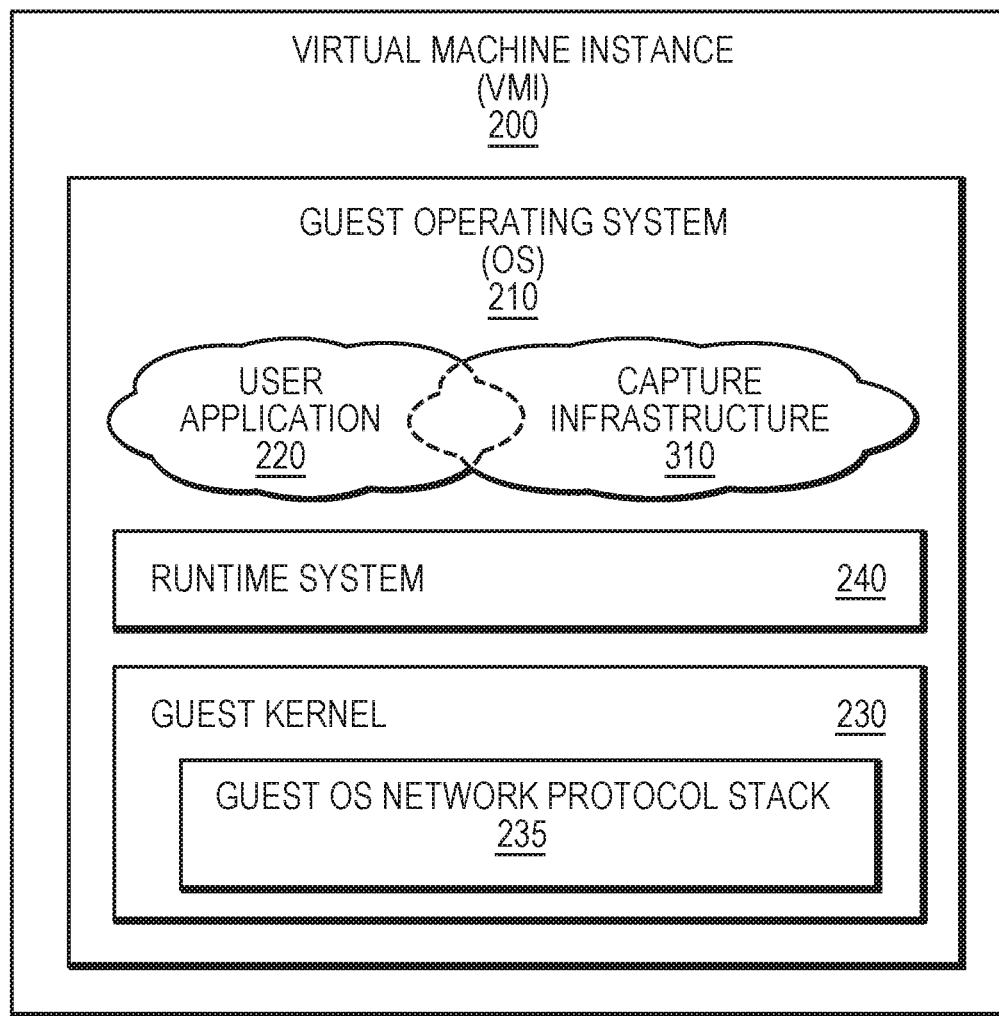
FIG. 2 is a block diagram of the virtual machine instance.

FIG. 2 is a block diagram of the virtual machine instance (VMI) 200. In an embodiment, guest operating system (OS) 210 and associated user application 220 may run (execute) in the VMI 200 and may be configured to utilize system (e.g., hardware) resources of the data center 110. The guest OS 210 may be a general-purpose operating system, such as FreeBSD, Microsoft Windows®, macOS®, and similar operating systems; however, in accordance with the embodiments described herein, the guest OS is illustratively the Linux® operating system. A guest kernel 230 of the guest OS 210 includes a guest OS network protocol stack 235 for exchanging network traffic, such as packets, over computer network 150 via a network data path established by the network adapter 128 and the hypervisor 125. Various data center processing resources, such as processor 122, main memory 124, storage adapter 126, and network adapter 128, among others, may be virtualized for the VMI 200, at least partially with the assistance of the hypervisor 125. The hypervisor may also present a software interface for processes within the VMI to communicate requests directed to the hypervisor to access the hardware resources.

A capture infrastructure 310 of the investigative platform may be employed (invoked) to facilitate visibility of the executing user application 220 by capturing and analyzing traces of the running user application, e.g., captured operations (e.g., functions and/or methods) of the user application and associated data/variables (e.g., local variables, passed parameters/arguments, etc.) In an embodiment, the user application 220 may be created (written) using an interpreted programming language such as Ruby, although other compiled and interpreted programming languages, such as C++, Python, Java, PHP, and Go, may be advantageously used in accordance with the teachings described herein.

Illustratively, the interpreted programming language has an associated runtime system 240 within which the user application 220 executes and may be inspected. The runtime system 240 provides application programming interfaces (APIs) to monitor and access/capture/inspect (instrument) operations of the user application so as to gather valuable information or "signals" from the traces (captured operations and associated data), such as arguments, variables and/or values of procedures, functions and/or methods. A component of the capture infrastructure (e.g., a client library) cooperates with the programming language's runtime system 240 to effectively instrument (access/capture/inspect) the executable code of the user application 220.

As described further herein, for runtime systems 240 that provide first-class support of callback functions ("callbacks"), callbacks provided by the client library may be registered by the user application process of the guest OS 210 when the executable code is loaded to provide points of capture for the running executable code. Reflection capabilities of the runtime system 240 may be used to inspect file path(s) of the executable code and enumerate the loaded methods at events needed to observe and capture the signals. Notably, a fidelity of the captured signals may be configured based on a frequency of one or more event-driven capture intervals and/or a selection/masking of methods/functions to capture, as well as selection/masking, type, degree and depth of associated data to capture. The event-driven intervals invoke the callbacks, which filter information to capture. The events may be triggered by method invocation, method return, execution of a new line of code, raising of exceptions, and periodic (i.e., time based). For languages that do not provide such first-class callback support, a compiler may be modified to insert callbacks as "hooks" such that, when processing the executable code, the modified compiler may generate code to provide initial signals passed in the callbacks to the client library, as well as to provide results from the callbacks to the client library. In other embodiments, the callbacks may be added at runtime, by employing proxy methods (i.e., wrapping invocations of the methods to include callbacks at entry and/or exit of the methods) in the executable code. Moreover, the client library (which is contained in the same process running the user application 220) may examine main memory 124 to locate and amend (rewrite) the executable code and enable invocation of the callbacks to facilitate instrumentation on behalf of the investigative platform.

Figure 3:
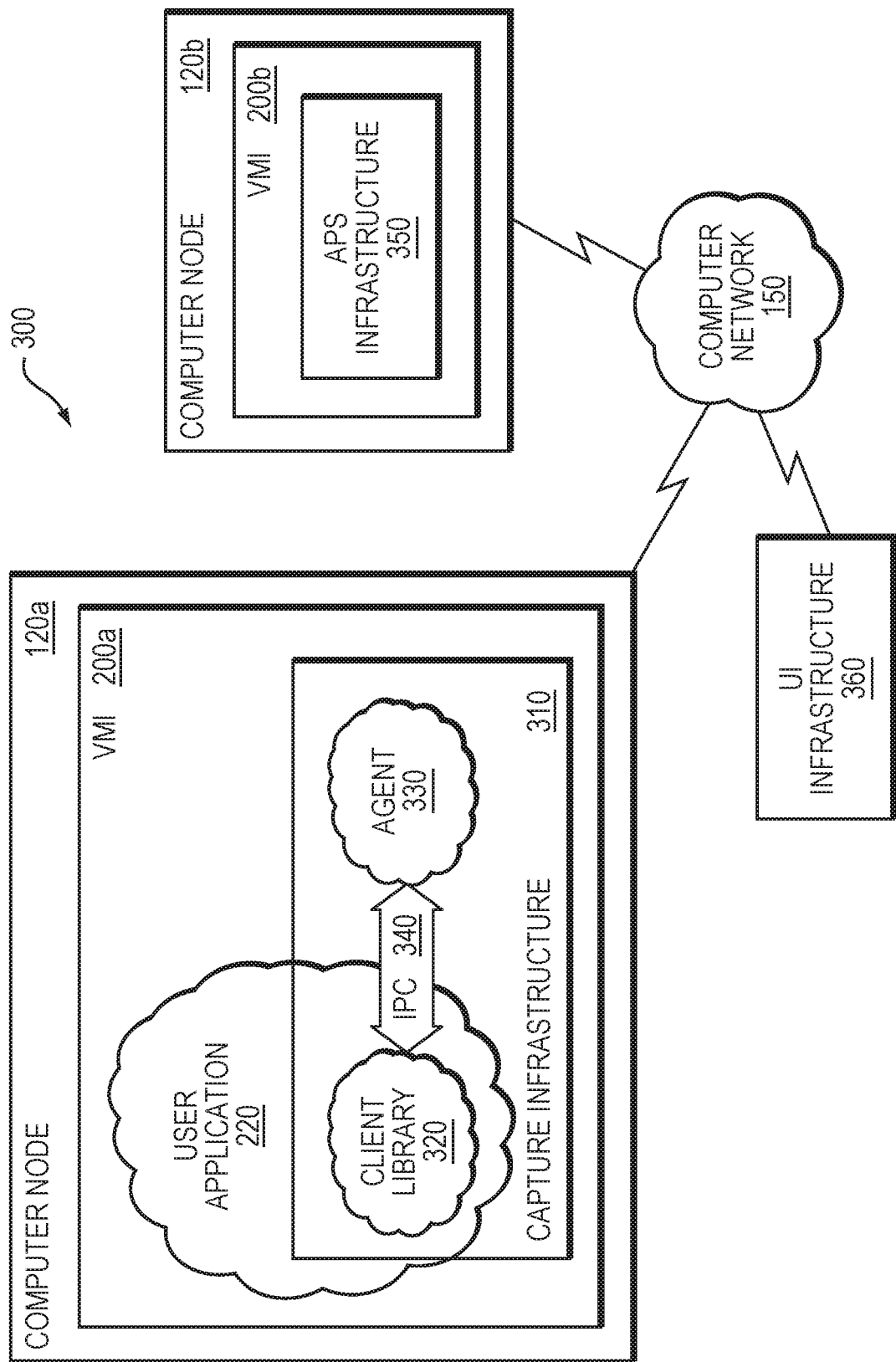
FIG. 3 is a block diagram of an investigative platform.

FIG. 3 is a block diagram of the investigative platform 300. In one or more embodiments, the investigative platform 300 includes the capture infrastructure 310 in communication with (e.g. connected to) an analysis and persistent storage (APS) infrastructure 350 as well as a user interface (UI) infrastructure 360 via computer network 150. Illustratively, the capture infrastructure 310 includes a plurality of components, such as the client library 320 and an agent 330, that interact (e.g., through the use of callbacks) to instrument the running executable code visible to the client library, initially analyze traces captured through instrumentation, compress and thereafter send the traces via the computer network 150 to the APS infrastructure 350 for comprehensive analysis and storage. The APS infrastructure 350 of the investigative platform 300 is configured to provide further multi-faceted and repeatable processing, analysis and organization, as well as persistent storage, of the captured traces. The UI infrastructure 360 allows a user to interact with the investigative platform 300 and examine traces via comprehensive views distilled by the processing, analysis and organization of the APS infrastructure 350. The capture infrastructure 310 illustratively runs in a VMI 200a on a computer node 120a that is separate and apart from a VMI 200b and computer node 120b on which the APS infrastructure 350 runs. Note, however, that the infrastructures 310 and 350 of the investigative platform 300 may run in the same or different data center 110.

In an embodiment, the client library 320 may be embodied as a software development kit (SDK) that provides a set of tools including a suite of methods that software programs, such as user application 220, can utilize to instrument and analyze the executable code. The client library 320 illustratively runs in the same process of the user application 220 to facilitate such executable code instrumentation and analysis (work). To reduce performance overhead costs (e.g., manifested as latencies that may interfere with user application end user experience) associated with executing the client library instrumentation in the user application process, i.e., allocating the data center's processing (e.g., compute, memory and networking) resources needed for such work, the client library queries the runtime system 240 via an API to gather trace signal information from the system, and then performs a first dictionary compression and passes the compressed signal information to an agent 330 executing in a separate process. The agent 330 is thus provided to mitigate the impact of work performed by the client library 320, particularly with respect to potential failures of the user application.

Illustratively, the agent 330 is spawned as a separate process of the guest OS 210 to the user application 220 and provides process isolation to retain captured traces in the event of user process faults, as well as to prevent unexpected processing resource utilization or anomalies from negatively impacting execution of the user application 220. As much processing as possible of the captured traces of the executable code is offloaded from the client library 320 to the agent 330 because overhead and latency associated with transmission of information (e.g., the captured traces) between operating system processes is minimal as compared to transmission of the information over the computer network 150 to the APS infrastructure 350. In an embodiment, the client library 320 and agent 330 may communicate (e.g., transmit information) via an Inter Process Communication (IPC) mechanism 340, such as shared memory access or message passing of the captured trace signals. Thereafter, the agent 330 may perform further processing on the captured traces, such as a second dictionary compression across captured traces, and then send the re-compressed captured traces to the APS infrastructure 350 of the investigative platform 300 over the computer network 150 for further processing and/or storage.

The embodiments described herein are directed to a trace anomaly grouping and visualization technique that groups traces with anomalies to cases to enable software developers to monitor, diagnose and solve anomalies (e.g., errors and performance abnormalities) associated with application development and production. A user links the client library 320 to the user application 220, e.g., after the client library is loaded into a process of the application and, thereafter, the client library (at initialization and thereafter on-demand) loads a dynamic configuration that specifies information such as, inter alia, methods and associated arguments, variables and data structures (values) to instrument as well as a fidelity of capture (i.e., a frequency and degree or amount of the information detail to gather of the running application) expressed as rules. Essentially, the dynamic configuration acts as a filter to define the type and degree of information to capture. The client library 320 inspects the executable code to determine portions of the code to instrument based on the rules or heuristics of the dynamic configuration. Capture points of the runtime application are implemented as callbacks to the client library 320 which, as noted, are registered with the runtime system executing the user application 220 and invoked according to the dynamic configuration. The dynamic configuration may be loaded from various sources, such as from the agent 330, the APS infrastructure 350, and/or via user-defined sources such as files, environment variables and graphically via the UI infrastructure 360.

Figure 4:
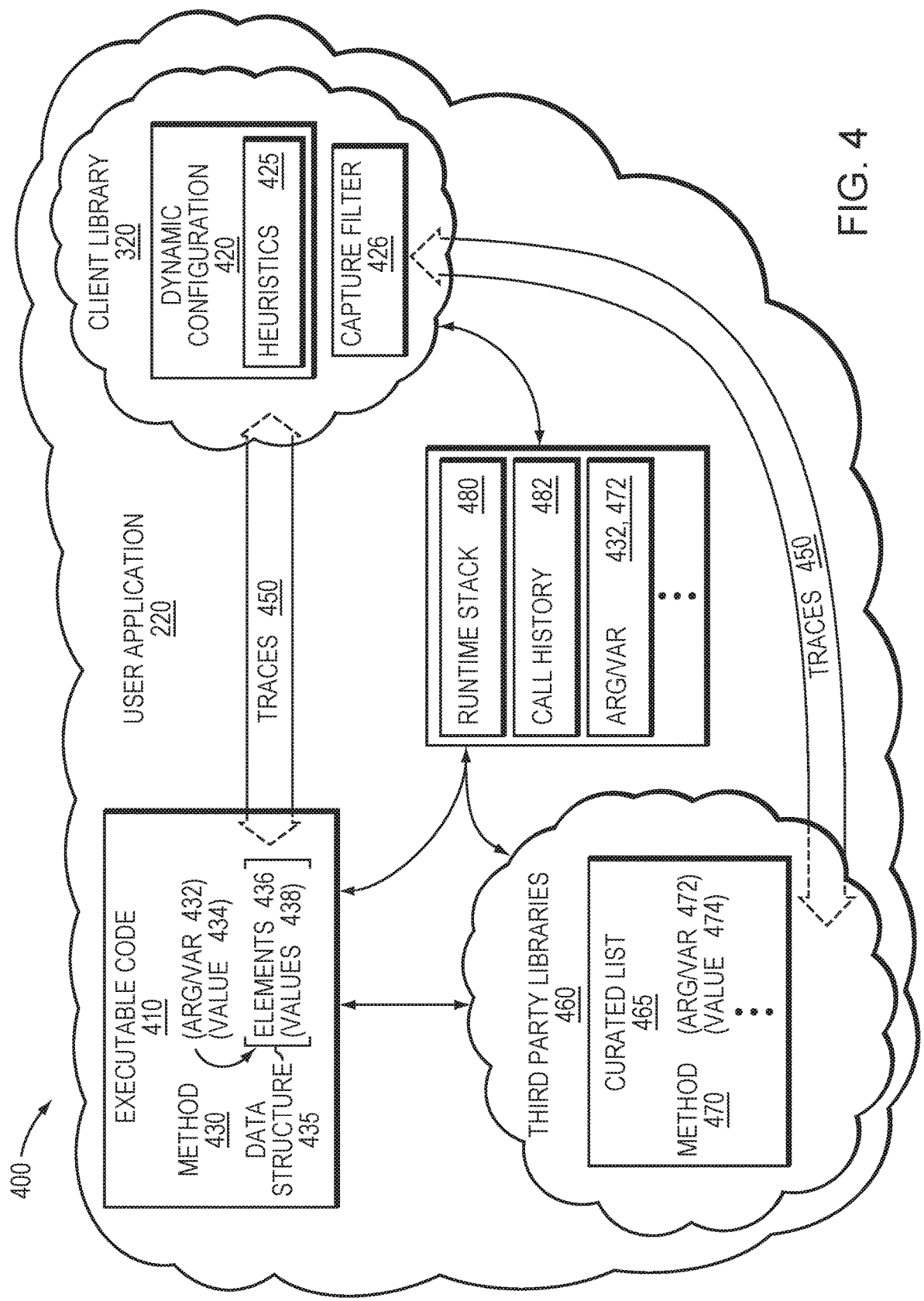
FIG. 4 illustrates a workflow for instrumenting executable code using a dynamic configuration.

FIG. 4 illustrates a workflow 400 for instrumenting executable code 410 using a dynamic configuration 420 in accordance with the instrumentation trace capture technique. Since there is only a finite amount of processing resources available for the client library 320 to perform its work, the technique optimizes the use of the processing resources in accordance with the dynamic configuration 420, which represents a degree of fidelity of executable code 410 and information to capture at runtime as traces of the executing methods and data of the executable code. In one or more embodiments, default rules or heuristics 425 of the configuration 420 are employed to dynamically capture the traces 450, wherein the default heuristics 425 may illustratively specify capture of (i) all methods 430 of the executable code 410 as well as (ii) certain dependencies on one or more third-party libraries 460 that are often mis-invoked (i.e., called with incorrect parameters or usage). A capture filter 426 is constructed (i.e., generated) from the dynamic configuration based on the heuristics. Changes to the dynamic configuration 420 may be reloaded during the capture interval and the capture filter re-generated. In this manner, the executable code 410 may be effectively re-instrumented on-demand as the capture filter screens the traces 450 to capture.

Illustratively, the capture filter 426 may be embodied as a table having identifiers associated with methods to instrument, such that presence of a particular identifier in the table results in trace capture of the method associated with the identifier during the capture interval. That is, the capture filter is queried (e.g., the capture table is searched) during the capture interval to determine whether methods of the event driving the capture interval are found. If the method is found in the capture filter 426, a trace 450 is captured (i.e., recorded). Notably the method identifiers may depict the runtime system representation of the method (e.g., symbols) or a memory address for a compiled user application and runtime environment. In an embodiment, the capture filter may be extended to include capture filtering applied to arguments, variables, data structures and combinations thereof.

A default dynamic configuration is based on providing a high fidelity (i.e., capture a high trace detail) where there is a high probability of anomaly. As such, the dynamic configuration may trade-off "high-signal" information (i.e., information very useful to debugging, analyzing and resolving errors) against consistently capturing a same level of detail of all invoked methods. For example, the third-party libraries 460 (such as, e.g., a standard string library or regular expression library) are typically widely used by software developers and, thus, are generally more reliable and mature than the user application 220 but are also likely to have incorrect usage by the user application. As a result, the heuristics 425 primarily focus on methods 430 of the user application's executable code 410 based on the assumption that it is less developed and thus more likely where errors or failures are to arise. The heuristics 425 (and capture filter 426) are also directed to tracing invocation of methods of the third-party libraries 460 by the user application via a curated list 465 of methods 470 of the third-part library having arguments/variables (arg/var) 472 and associated values 474 deemed as valuable (high-signal) for purposes of debugging and analysis. Notably the curated list 465 may be folded into the capture filter 426 during processing/loading of the dynamic configuration 420. That is, the curated list includes high-signal methods of the third-party library most likely to be mis-invoked (e.g., called with incorrect calling parameters) and, thus, benefits debugging and analysis of the user application 220 that uses the curated high-signal method. The technique utilizes the available processing resources to capture these high-signal method/value traces 450.

Illustratively, the client library 320 may examine a language runtime stack 480 and associated call history 482 using, e.g., inspection APIs, to query the runtime system during a capture interval to gather symbolic information, i.e., symbols and associated source code (when available), from the runtime system 240, invocations of methods 430, 470, associated arguments/variables 432, 472 (including local and instance variables), return values 434, 474 of the methods, and any exceptions being raised. Notably, the gathered symbolic information of a captured trace may include one or more of (i) high-level programming text processed by the runtime system, which may be derived (generated) from source code stored in repositories; and (ii) symbols as labels representing one or more of the methods, variables, data and state of the executable code. When an exception is raised, the client library 320 captures detailed information for every method in the stack 480, even if was not instrumented in detail initially as provided in the dynamic configuration 420. That is, fidelity of trace capture is automatically increased (e.g., from a first level to a second level) during the capture interval in response to detecting a raised exception. Note that in some embodiments, this automatic increase in trace capture detail may be overridden (superseded) in the dynamic configuration by a manual override. In some embodiments, the runtime system executable code 410 may have limited human readability (i.e., may not be expressed in a high-level programming language) and, in that event, mapping of symbols and references from the executable code 410 to source code used to generate the executable code may be gathered from the repositories by the APS infrastructure 350 and associated with the captured trace.

The client library 320 may also inspect language runtime internals to determine values of data structures used by the application 220. In an embodiment, the dynamic configuration 420 for data structures may involve "walking" the structures and capturing information based on a defined level of nesting (e.g., a nested depth of the data structures) which may be specified per data structure type, instance and/or method as provided in the dynamic configuration 420. As stated previously for language implementations that do not provide first-class callback support, a compiler may be modified to insert callbacks as "hooks" such that, when processing the executable code 410, the modified compiler may generate code to provide initial signals passed in the callbacks to the client library 320 which may inspect the stack 480 directly (e.g., examine memory locations storing the stack). In other embodiments, the client library may add callbacks at runtime in the executable code via proxy methods (i.e., wrapping invocations of the methods to include the callbacks at entry and/or exit of the methods).

In an embodiment, the client library 320 collects (captures) signals from the traces 450 (trace signal information) such as (i) method invoked, i.e., a method for which the exception occurred, (ii) method source location, (iii) stack trace (i.e., serial order of method calls), (iv) operation name, i.e., a name of operation for which the exception occurred, (v) method arguments, (vi) local variable values, (vii) return values, (viii) any associated exception, (ix) and any exception state of values collected. Notably, for a trace capturing an anomaly (e.g., an exception) an increased fidelity of information capture may be made, such as gathering all parameters of the invoked method and deeper nested depth of data structures. As used herein, an anomaly denotes any departure from an expected norm of operation which leads a user application to deliver an unintended experience to an end user including, inter alia, (i) failures disrupting operations; (ii) exceptions being raised; (iii) performance outside a range (e.g., slower than an expected lowest bound or faster than an expected highest bound); (iv) lack of data integrity (e.g., empty fields of data structures, trampled data structures, incorrect pointer references which may lead to address space violations/exceptions); (v) data security violations, such as leaking personal identifiable information (PII); (vi) resource management errors (e.g., memory leaks from failure to correctly deallocate objects/memory); (vii) abnormal operating system resource consumption (e.g., abnormal/excessive input/output operations, such as network bandwidth, storage operations and space consumed); and (viii) application process state abnormalities (e.g., deadlocks, zombie processes, hang-ups and the like). The client library 320 sends the trace signal information to the APS infrastructure 350 of the investigative platform 300 for analysis and processing to determine logical groupings of traces by common anomalies into datasets. The technique may group the anomaly traces into the datasets based on a common cause for an anomaly using the arguments, local variables, and/or return values of methods as well as any exception in the trace execution. Notably, the grouping may be based on any aspect of anomaly as enumerated above.

Illustratively, the trace anomaly grouping and visualization technique organizes (associates) related trace signals of methods with anomalies (e.g., exceptions, errors and the like) into the datasets called "cases" based on the common cause for an anomaly and correlates the signals to identify a case, i.e., generate a case signature. As used herein, a case is defined as a collection of traces (e.g., execution of code and associated data/variables) with anomalies. The trace signal information collected by the client library 320 may be used to differentiate between root causes of the failures using a comparative visualization of traces displayed on a standard UI using the UI infrastructure 360. As such, the technique facilitates an understanding of differences among traces of executable code that resulted in the failure and traces without failure (i.e., "healthy" traces) by providing the ability to comparatively examine views of those traces displayed on the standard UI. Sometimes, a simple situation is presented where knowledge of the method raising the exception and a source location of the exception are sufficient to determine and resolve a case, for example, by deploying a change to the user application as a result of discovering a flaw in the method raising the exception. However, the exception may be raised by a method in a library which is called from many locations, each of which may yield an initial grouping into a different case. In this scenario, examination of the frames of the stack trace may be used to disambiguate similar cases. Yet, there are scenarios where all of these values are similar. The technique may further disambiguate those cases by inspecting values of arguments or local variables of the method raising the exception. Notably, the cases may be associated across users of the investigative platform for further insight in resolving anomalies, such as how many different users executing the application have experienced the same anomaly. The dynamic configuration 420 contains a list of configurations for different well-known user/account libraries, as well as APIs sufficient to specify a case signature or identifier (ID) for a user. This case ID may be used to display a case to a user with affected traces/operations and anomalies that have been experienced over a period of time. That is, accumulated traces from one or more cases regarding an anomaly may be shared among users for refining and resolving the anomaly.

In an embodiment, the trace anomaly grouping and visualization technique described herein provides a uniform resource locator (URL) home page (e.g., for display on the standard UI) provided by the UI infrastructure that lists (i.e., catalogues) all cases. Illustratively, each case is accorded an individual, persistent (i.e., accessed through a constant URL) page for accessing and visualizing the traces corresponding to a respective case, i.e., allows the user to view traces as well as detailed instrumentation including method invocations, arguments, return values, local variables, instance variables and errors (e.g., raised exceptions) for instrumented methods. A collection of all captured trace information may be displayed on the UI so the user can navigate to any part of the trace and find values from the detailed instrumentation. Signals of two or more traces may be selected manually or automatically and displayed side-by-side for comparison, i.e., the user may compare traces with anomalies (e.g., errors) side-by-side with similar traces (e.g., with the errors at a same operation in the executable code) to examine differences about the traces with anomalies.

In an embodiment, automatic selection of traces may be rendered from a bicameral trace classification: healthy traces (i.e., those without anomaly) and failure traces (i.e., those with anomaly), wherein one or more traces from each classification may be chosen based on search criteria, such as method exceptions, data values and method performance. In this manner, a large collection of healthy traces and failure traces for a case may be pooled for selection of representative traces that enhance render aspects of (i.e., clarify) the anomaly refined by the selection criteria. In addition, selection criteria include execution performance of traces that permit the user to compare, e.g., slow and typical execution of methods, requests and operations, to determine which part caused the slower performance. Illustratively, after a change is made to the user application ostensibly to correct anomalies, the technique determines whether the application is still generating traces with the same anomalies associated with a given case based on the case signature. If so, the case is considered to still be open. If not, the case is considered closed.

Figure 5:
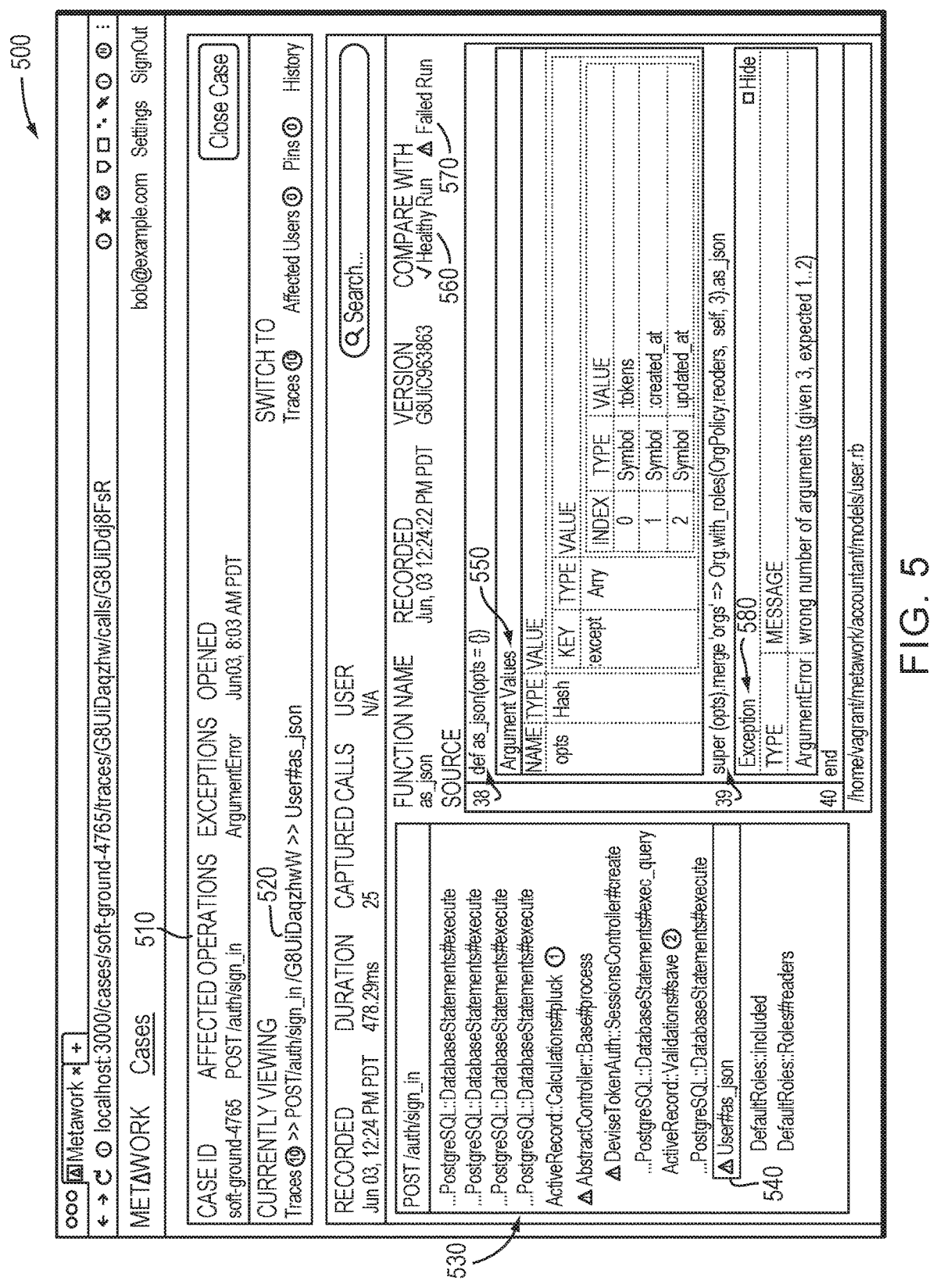

FIG. 5 is a screenshot of a user interface (UI) embodiment that displays a trace anomaly (e.g., failure, error and the like) on the standard UI in accordance with a trace anomaly grouping and visualization technique. The UI screenshot displays a case-specific page 500 (e.g., shown as case ID: soft-ground-4765) to which a user has navigated from a cases homepage that catalogues cases. Illustratively, the case-specific page 500 is a logical grouping of anomalies across a set of affected operations for a trace. An affected method (operation), e.g., shown at 510 as "POST/auth/sign_in" (i.e., http POST method authentication sign-in), facilitates a user's log-in to a service. The case-specific page also displays the trace for which the anomaly occurred, e.g., shown at 520 as Trace identified as "G8UiDaqzhwW." This aspect of the technique enables the user to view details of the anomaly (rather than a summary of what may have occurred) and, thus, facilitates refining the cause of the anomaly. In an embodiment, the technique provides the ability to select different traces included in the case to allow viewing of repeated instances of the anomaly to further refine and corroborate the cause of the anomaly.

For trace G8UiDaqzhwW, a stack trace navigator (i.e., "Tracestack nav") is displayed on the left-hand side of the screenshot (shown as 530) that shows all processes/methods (i.e., calls) that link together to facilitate the operation POST/auth/sign_in. Illustratively, the Tracestack nav shows various database calls, as well as a sequence of calls that resulted in an exception (anomaly) being raised. Notably, the sequence of calls is a culled set of the calls, rather than a full set (e.g., thousands of calls) that occur as part of POST/auth/sign_in. Illustratively, the culled call set is displayed as a "daisy chain" to the call/method where the anomaly occurred which, in this scenario, is a PostgreSQL command to execute "User#as_json" (shown at 540), as denoted by a triangle warning signal icon adjacent to the failed call. The technique renders all other calls of the trace so that the causal path to the anomaly is displayed. Notably, the Tracestack nav may be expanded to view all other calls in the event that examination of relevant activity is desired.

Details of the anomaly (in this case, an exception) associated with the failed call are shown on the right-hand side of the screenshot, including identification of the failed call (e.g., User#as_json shown at line 38) and specific values (shown at 550) being passed as part of Trace G8UiDaqzhwW, as well as the actual line of code that generated the exception (e.g., "super (opts).merge" shown at line 39). The combination of these anomaly details provides the user with sufficient information to understand that an anomaly occurred and, notably, why it occurred (e.g., a wrong number of arguments). For example, the exception raised (failure) in this scenario is a "method invocation anomaly" or function of the attempted method invocation and the available method signatures, e.g., a wrong number of arguments passed to the call/method.

In an embodiment, the technique enables simultaneous display of multiple traces on the standard UI. The traces may be selected automatically from a general notion of a "healthy trace" (run) and a "failed trace" based on search criteria, such as method exceptions (i.e., failed trace), data values and method performance. Illustratively, the traces may be displayed in a comparative difference ("diff") mode to enable, e.g., comparison of the healthy trace to the failed trace. For instance, a failed trace may be compared with a healthy trace that was captured, but where the failure is a "runtime error" or function of the data passed into the method. In addition, the failed trace may be compared with a healthy trace (run) captured at an earlier time, e.g., before the user application code was deployed in production.

In an embodiment, the technique provides automated selection (sample) of which traces to use for comparison, e.g., a most recent healthy trace that was recorded (which may not necessarily be the most recent healthy trace), to identify and understand differences between traces. To that end, a healthy trace (run) may be selected to compare with the displayed failed trace by, e.g., clicking on the "Healthy Run" link shown at 560. Further, another unhealthy (failed) trace may be selected to compare by, e.g., clicking on the "Failed Run" link shown at 570. This allows for a visual understanding of differences or similarities between, e.g., two failed runs (traces) via the "Type" (i.e., a type of anomaly, here an exception) and "Message" (i.e., information from the runtime system and/or state of the application at the anomaly, here a diagnostic indicating a cause of the exception) descriptions associated with the "Exception" display (shown at 580). Yet another healthy trace may be selected to validate and strengthen its perspective of the cause of failure (e.g., for debugging purposes.)

In addition to highlighting the differences between the traces, the technique may enable selection of traces to compare based on filtering criteria, such as various characteristics (attributes) of the running source code that are collected and computed by the investigative platform. The filtering attributes may be analyzed to facilitate an understanding as to differences between healthy and unhealthy traces. An example of such a characteristic may be time (e.g., calendar time) associated with a version of the executable code. As noted, the error associated with the method/call User#as_json is shown at line 39. For example, comparison of that method with a trace of the same method previously recorded (e.g., one day previously) may reveal that the previous method has no error (exception). The technique enables display of this information (via the UI) to highlight this fact for debugging purposes, e.g., the difference between a failed state and a healthy state of the user application may be specific to a version of the executable code and libraries as part release of the user application. Accordingly, the user may want to revert to running a previous healthy version release of the user application software.

The technique also allows for analysis of traces via displayed characteristics such as p-latency curves. For example, if a long-tail latency (p99) for an operation is dramatically different from a median latency (p50), then other correlations (i.e., signals collected in the traces) may be analyzed. That is, the correlations may be analyzed to determine which signals are highly correlated with the change in latency. For arguments passed in a method or passed in a method that calls another method, this may result in calculation and analysis of correlations between, e.g., size/length of captured array arguments. This, in turn, may reveal that the p50 array arguments are small, but that the p99 array arguments are much larger. These calculated coefficients may be employed to focus on those signals correlated with an undesirable (failed) state as compared with a desirable (healthy) state. This may further lead to identifying a potential root cause of the difference (i.e., the characteristic is causal) and direct the user's attention to this potential cause, e.g., a faulty algorithm in the executable code that results in the undesirable, slow servicing of a request.

Another example of a case grouping of traces by anomaly is incidence of performance degradation or abnormal slowness common to a group of traces. Illustratively, during examination of an operation or request, a sub-operation may be uncovered that (e.g., 10% of the time) fails or is slow. For example, analysis of the displayed p-latency curves may reveal that, e.g., the p99 latency takes (is) 5 secs, whereas the p50 latency is 1 sec. The user may analyze this information to determine that the root cause is a cache memory problem, e.g., 10% of the time the cache memory is empty. Accordingly, a solution to such failure or performance degradation may be to "warm" the cache properly.

Advantageously, the display and analysis of such detailed characteristic information provides an enhanced observability and visualization tool that displaces user experiences around conventional metrics dashboards. By examining and analyzing sample sets of traces across characteristics, such as time, latencies, etc., the user experience is greatly increased as compared to conventional debugging tools.

While there have been shown and described illustrative embodiments for grouping traces with anomalies to cases using the trace anomaly grouping technique, it is to be understood that various other adaptations and modifications may be made within the spirit and scope of the embodiments herein. For example, embodiments have been shown and described herein with relation to the client library capturing trace signal information from the traces and sending the information to the APS infrastructure for analysis and processing to determine logical groupings of traces by common anomalies. However, the embodiments in their broader sense are not so limited, and may, in fact, allow for the APS infrastructure to determine the exact source code run by the application. Determination of the exact source code running in the user application is non-trivial and often does not match the source code contained in a source repository of the user application for a number of reasons. For example, the source code is often split across an arbitrary number of dependent repositories. The source code executed in the user application is often generated and the repository does not contain that generated source code. The source code may have local changes which are not contained in the repository. The APS infrastructure processes the captured source code and displays, e.g., via the standard UI of the UI infrastructure, the exact version of the code which executed when the traces were captured and anomalies occurred.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, and/or electronic memory) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
  instrumenting executable code of an application to capture traces of execution of the application on a computer node having a memory, wherein instrumenting of the executable code is in accordance with a capture configuration determining a fidelity of trace capture;
  capturing the traces of execution during a callback to a client library, wherein the traces include information selected from one or more of methods, variables, data, state of the executable code or exceptions raised during execution of the application;
  analyzing the traces to associate a root cause with a common anomaly resulting from failures of operations of the executable code by correlating the information of different traces;
  grouping the traces into datasets according to the common anomaly; and
  providing a side-by-side comparative visualization via a user interface (UI) of a plurality of traces from a selected dataset, wherein the comparative visualization highlights the root cause associated with the selected dataset, wherein the root cause includes errors, faults or inefficiencies in the executable code.

2. The method of claim 1 wherein providing the comparative visualization via the UI of the plurality of traces further comprises automatically selecting the plurality of traces from a bicameral trace classification including healthy traces without anomalies and traces with anomalies.

3. The method of claim 1 wherein the plurality of traces is selectable via the UI based on search criteria selected from one or more of method exceptions, data values or method performance.

4. The method of claim 1 wherein the comparative visualization provides correlations of the information from the captured traces with latency percentiles.

5. The method of claim 1 further comprising associating the common anomalies across users of the application.

6. The method of claim 1 further comprising disambiguating traces in a dataset by examining frames of stack traces.

7. The method of claim 1 further comprising disambiguating traces in a dataset by inspecting values of one of arguments or local variables of a method in the trace raising an exception.

8. The method of claim 1 wherein the datasets are shared among users.

9. The method of claim 1 wherein the common anomaly is an incidence of performance degradation among the captured traces.

10. The method of claim 1 wherein the common anomaly is a data security violation leaking personal identifiable information.

11. A non-transitory computer readable medium including program instructions for execution on one or more processors, the program instructions configured to:
    instrument executable code of an application to capture traces of execution of the application on a computer node having a memory, wherein the executable code is instrumented in accordance with a capture configuration determining a fidelity of trace capture;
    capture the traces of execution during a callback to a client library, wherein the traces include information selected from one or more of methods, variables, data, state of the executable code or exceptions raised during execution of the application;
    analyze the traces to associate a root cause with a common anomaly resulting from failures of operations of the executable code by correlating the information of different traces;
    group the traces into datasets according to the common anomaly; and
    provide a side-by-side comparative visualization via a user interface (UI) of a plurality of traces from a selected dataset, wherein the comparative visualization highlights the root cause associated with the selected dataset, wherein the root cause includes errors, faults or inefficiencies in the executable code.

12. The non-transitory computer readable medium of claim 11, wherein the program instructions configured to provide the comparative visualization are further configured to automatically select the plurality of traces from a bicameral trace classification including healthy traces without anomalies and traces with anomalies.

13. The non-transitory computer readable medium of claim 11, wherein the plurality of traces is selectable via the UI based on search criteria selected from one or more of method exceptions, data values or method performance.

14. The non-transitory computer readable medium of claim 11, wherein the comparative visualization provides correlations of the information from the captured traces with latency percentiles.

15. The non-transitory computer readable medium of claim 11, wherein the program instructions are further configured to associate the common anomalies across users of the application.

16. The non-transitory computer readable medium of claim 11, wherein the program instructions are further configured to disambiguate traces in a dataset by examining frames of stack traces.

17. The non-transitory computer readable medium of claim 11, wherein the program instructions are further configured to disambiguate traces in a dataset by inspecting values of one of arguments or local variables of a method in the trace raising an exception.

18. The non-transitory computer readable medium of claim 11, wherein the datasets are shared among users.

19. The non-transitory computer readable medium of claim 11, wherein the common anomaly is an incidence of performance degradation among the captured traces.

20. A system comprising:
    a node including a processor and a memory, the memory including an application having executable code linked to a client library with program instructions configured to,
        instrument the executable code to capture traces of execution of the application according to a capture configuration determining a fidelity of trace capture;
        capture the traces of execution during a callback to the client library, wherein the traces include information selected from one or more of methods, variables, data, state of the executable code or exceptions raised during execution of the application;
        analyze the traces to associate a root cause with a common anomaly resulting from failures of operations of the executable code by correlating the information of different traces;
        group the traces into datasets according to the common anomaly; and
        provide a side-by-side comparative visualization via a user interface (UI) of a plurality of traces from a selected dataset, wherein the comparative visualization highlights the root cause associated with the selected dataset, wherein the root cause includes errors, faults or inefficiencies in the executable code.

* * * * *